No. 788,922. Patented May 2, 1905.

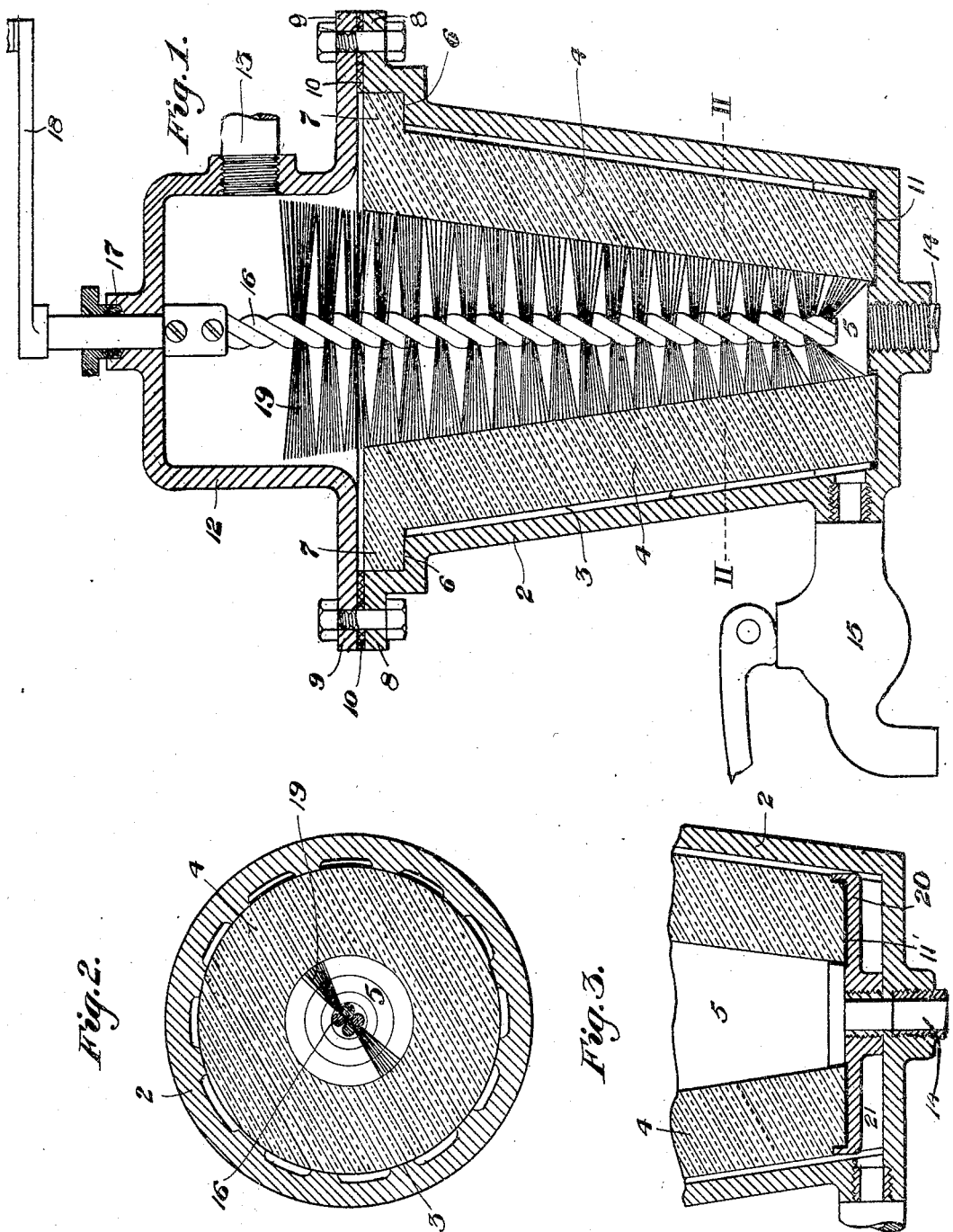

UNITED STATES PATENT OFFICE.

GEORGE W. MacKENZIE, OF BEN AVON, PENNSYLVANIA, ASSIGNOR OF TWO-THIRDS TO WILLIAM J. ARCHER, OF VANPORT, PENNSYLVANIA.

FILTER.

SPECIFICATION forming part of Letters Patent No. 788,922, dated May 2, 1905.

Application filed April 16, 1904. Serial No. 203,429.

*To all whom it may concern:*

Be it known that I, GEORGE W. MACKENZIE, a citizen of the United States, residing at Ben Avon, in the county of Allegheny and State of Pennsylvania, have invented certain new and useful Improvements in Filters, of which the following is a specification, reference being had therein to the accompanying drawings.

My invention relates to the class of filters, and is particularly designed as a domestic filter for household use to filter a limited amount of water as it is drawn from the service main or pipe.

It has for its objects to provide a device of this character capable of being easily and quickly cleaned of the accumulation of sediment, to provide means for compensating the wear or abrasion of the filtering medium or of the sediment-removing element, while at the same time insuring great simplicity and cheapness of construction, thereby particularly adapting it to general use by the public.

Referring now to the drawings, Figure 1 is a vertical sectional view of my improved filter. Fig. 2 is a cross-sectional view on the line II II of Fig. 1. Fig. 3 is a partial sectional view of the lower portion of the filter, illustrating a modified construction.

Referring now to the drawings, 2 represents the main case or shell of any suitable non-corrosive material, as aluminium, preferably cylindrical in cross-section, closed at the bottom and tapering downwardly in the form of a frustum. The inner surface of the shell is preferably provided with inwardly-extending ribs or abutments 3, adapted to provide bearings for the correspondingly-shaped filtering medium 4, which is nested within the casing 2 and is provided with an interior downwardly-tapering opening 5, the inner sides of which preferably approximately conform to the tapering walls of the shell. The outer walls of the filtering medium do not, however, necessarily taper and may approximate a cylindrical or any other desired form. The ribs 3 may extend to within a short distance of the bottom of the case, thereby providing an annular circulating-chamber for the filtered water, from which it will pass to the faucet, or they may extend clear to the bottom, as in Fig. 4, a circulating-chamber being provided underneath the washer-base for the same purpose. The shell is also preferably provided at its upper portion with an annular shelf 6, adapted to support the filtering medium 4 by means of an integral annular flange 7. The case is also provided at the top with an annular flange 8, upon which the flange 9 of the top of the filtering-frustum 4 is bolted, as shown, an intervening gasket 10, of rubber or other suitable material, being employed to make a water-tight joint. At its bottom the filtering medium, which is also in the form of a hollow frustum or otherwise, is set upon the bottom of the shell or casing in a layer 11 of cement, by which a water-tight joint between the filtering element and the bottom of the casing is made. The top 12 of the case is secured to the main case by flange 9, as described, and projects upwardly above the main body portion in the form of a supplemental receiving-chamber, as shown, into which the water to be filtered is introduced by a pipe 13, connected with any suitable source of supply.

To the bottom of the case 2 is connected a flush-pipe 14, provided with a valve or stop-cock, whereby a circulation of water is established through the interior of the apparatus for the purpose of carrying off the accumulated sediment from time to time as it is removed by the brush. A withdrawing-faucet 15 is connected with the lower end of the case 2.

For the purpose of scouring or removing the accumulated sediment from the interior of the filtering medium from time to time I have provided a central vertical stem 16, passing upwardly through a stuffing-box 17 in the top of the case, projecting upwardly therefrom a sufficient distance to provide for downward travel and wear-compensating movement and provided with a turning crank or handle 18 of any suitable form. The stem 16 is provided with laterally-extending brushes 19, preferably arranged in oppositely-located vertical rows of bristles, as shown in Fig. 2, although any suitable arrangement of the bristles may be employed adapted to bear outwardly at each side. These bristles may be made of wire, bristles, fiber, or any suitable material firmly connected with the stem and having a tapering contour, so as to correspond and make contact with the interior face of the filtering medium throughout their length. As the stem is rotated in the operation of cleaning it may be also depressed downwardly, and by such vertical adjustment it will be seen that the brush may always be kept in operative engagement with the filtering-frustum. Ordinarily it will not be necessary to exert more than a slight downward pressure as the brush is lowered, so that it will thus constantly tend to compensate for wear. Both of the brushes of the filtering medium thereby constantly maintain the device in efficient operative condition.

In Fig. 4 I have shown a modified construction wherein a supplemental base-plate or washer 20 is secured either to an upwardly-extending lug on the inner face of the base of the shell or upon an independent nipple tapped into the base or in any other suitable or preferred manner. The filtering-frustum 4 rests upon such bearing with an intervening cementing substance 11', thereby providing a lower annular circulating-space 21, from which the water from all sides will pass freely to the faucet. Any suitable packing substance or material, as rubber, may be substituted for the cement 11' with equally good results.

The operation of the device will be evident from the foregoing description.

Changes and variations may be made in its design, construction, proportion, or various other details without departing from the invention, and all such are to be considered as within the scope of the following claims.

What I claim is—

1. A filter consisting of an outer inclosing case having internal bearing projections and circulation-grooves and provided with an inlet and flushing connection communicating with its interior, a hollow filtering medium inclosed therein provided with a central tapering chamber throughout its length, a centrally-arranged longitudinally-adjustable rotatable cleaning-brush, and a withdrawing-faucet communicating with the exterior of the filtering medium, substantially as set forth.

2. In a filter, the combination of an outer surrounding case having internal bearing projections and circulation-grooves, a hollow filtering medium mounted therein and provided with a central tapering chamber throughout its length, means for providing a sealing-joint with the bottom of the case, a centrally-arranged scouring-brush within the filtering-chamber, and connections adapted to supply and withdraw water from the filter, substantially as set forth.

3. In a filter, the combination of an outer surrounding case, a hollow filtering medium mounted therein provided with an internal tapering chamber throughout its length, means for providing a sealing-joint with the bottom of the case, circulating-passages and intervening bearings between the case and the filtering medium, means for supplying and withdrawing water, and a centrally-disposed rotatable longitudinally-adjustable brush adapted to remove the sediment from the interior of the filtering medium, substantially as set forth.

4. In a filter, the combination of an outer surrounding case, a hollow filtering medium mounted therein provided with an internal tapering chamber throughout its length, means for providing a sealing-joint with the bottom of the case, circulating-passages and bearings between the case and the filtering medium, means for supplying and withdrawing water, and a centrally-disposed rotatable longitudinally-adjustable stem provided with oppositely-extending bristles tapered to fit the inner face of the filtering medium, substantially as set forth.

5. In a filter, the combination of an outer surrounding case provided with vertical bearing-ribs and intervening circulation-passages, a hollow filtering medium mounted therein provided with an internal chamber extending throughout, open at each end, and having internal tapering walls, a supporting device therefor having incorporated with it a sealing-joint, a circulation-passage underneath said support communicating with the circulation-passages of the case and with a withdrawal-faucet, a supply connection and a waste connection at opposite ends of the case respectively, whereby water is introduced to the interior of the filtering medium, and a centrally-disposed, rotatable, longitudinally-adjustable stem mounted in one end of the case provided with oppositely-extending bristles tapered to fit the inner face of the filtering medium, substantially as set forth.

In testimony whereof I affix my signature in presence of two witnesses.

GEORGE W. MacKENZIE.

Witnesses:
JAS. J. McAFEE,
C. M. CLARKE.